C. H. BEDELL.
PERISCOPE WITH COMPASS ATTACHMENT.
APPLICATION FILED OCT. 8, 1910.
1,043,562.
Patented Nov. 5, 1912.
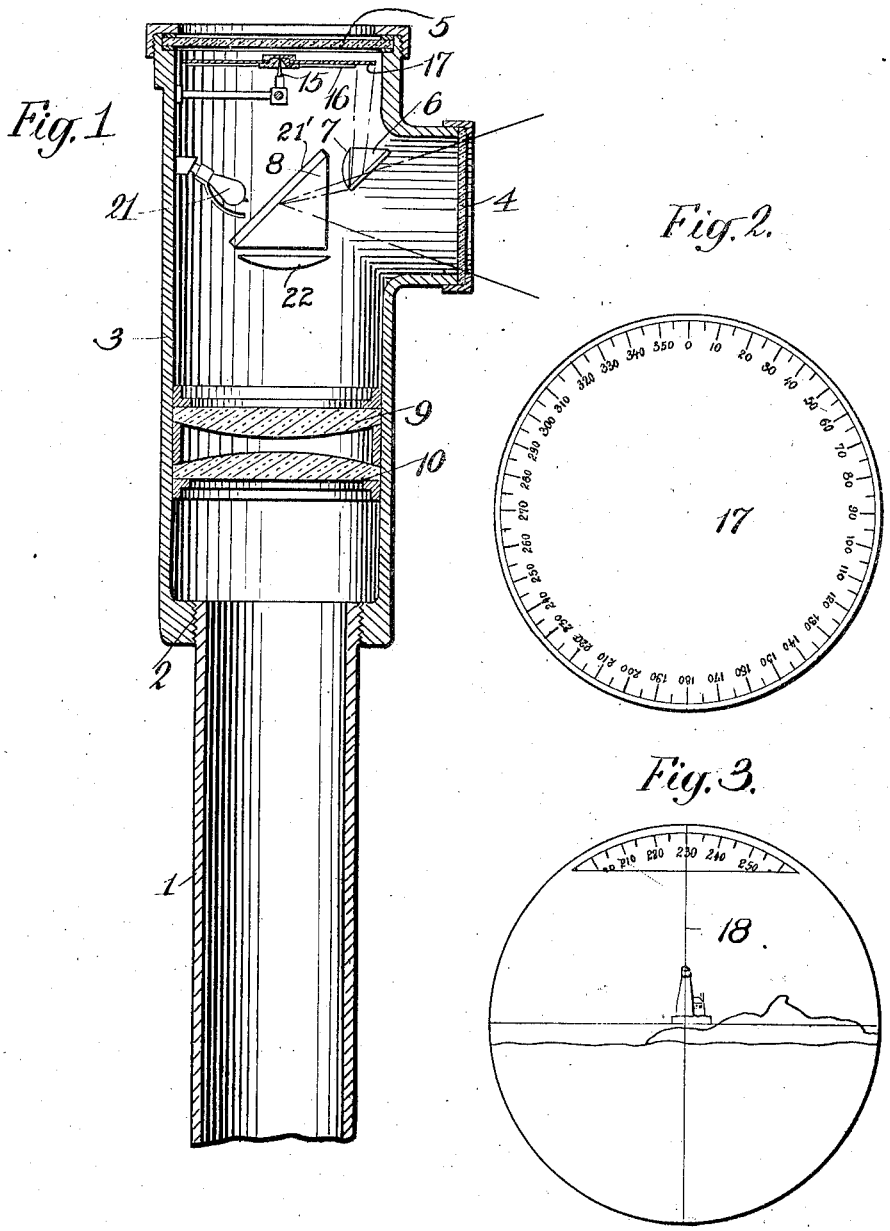

C. H. BEDELL.
PERISCOPE WITH COMPASS ATTACHMENT.
APPLICATION FILED OCT. 8, 1910.
1,043,562.
Patented Nov. 5, 1912.
2 SHEETS—SHEET 2.
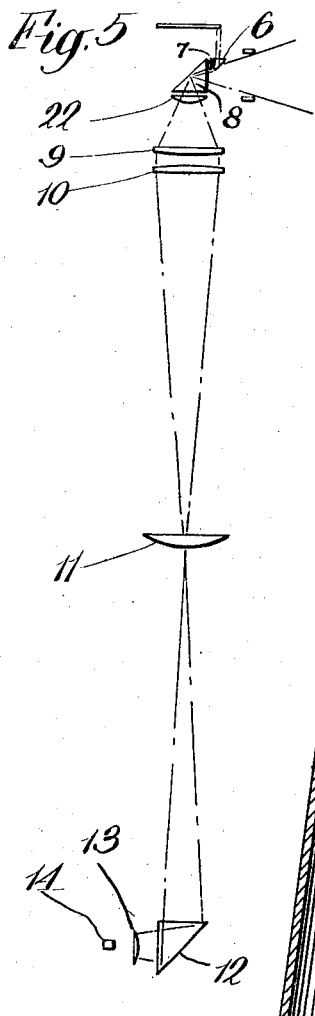
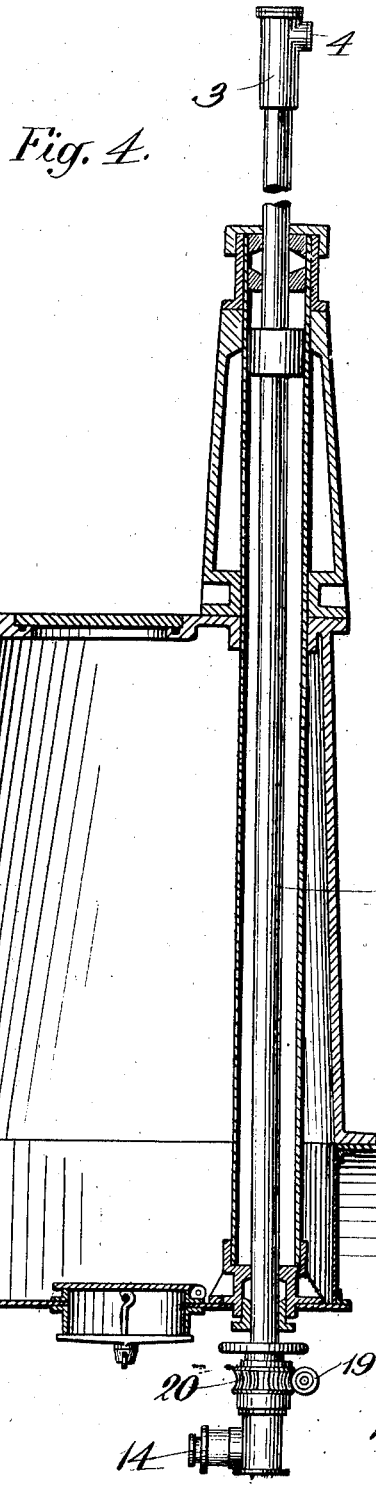
WITNESSES:
INVENTOR
Charles H. Bedell
BY
ATTORNEYS

UNITED STATES PATENT OFFICE.

CHARLES H. BEDELL, OF WOLLASTON, MASSACHUSETTS, ASSIGNOR TO ELECTRIC BOAT COMPANY, OF NEW YORK, N. Y., A CORPORATION OF NEW JERSEY.

PERISCOPE WITH COMPASS ATTACHMENT.

1,043,562.  Specification of Letters Patent.  Patented Nov. 5, 1912.

Application filed October 8, 1910. Serial No. 585,958.

*To all whom it may concern:*

Be it known that I, CHARLES H. BEDELL, a citizen of the United States, residing at Wollaston, county of Norfolk, State of Massachusetts, have invented certain new and useful Improvements in Periscopes with Compass Attachments; and I do hereby declare the following to be a full, clear, and exact description of the invention, such as will enable others skilled in the art to which it appertains to make and use the same.

My invention relates to improvements in periscopes for submarine craft and the like, in which the image of the observed objects is produced in conjunction with an image of a compass scale in such relation thereto that the position of any particular object in the field of view is determined more accurately and more speedily.

In accordance with my invention the compass is removed to a point within least magnetic influence of the boat and the image of its scale is produced in conjunction with the image of the observed objects embraced in the field of view, so that the resultant image immediately discloses, by use of cross-hairs, both the particular object under observation and its definite compass bearing, and with minimum error due to magnetic disturbances.

In the accompanying drawings forming a part of this specification, and illustrating the preferred embodiment of my invention, Figure 1 is a sectional elevation of the upper part of the periscope showing the compass, prisms and lenses located therein; Fig. 2 is an illustration of the graduated scale of the compass. The optical system is such as to invert the image of this scale, and in consequence the numbers should be arranged thereon as viewed in a mirror, but in the drawing they are shown in the ordinary arrangement, to avoid confusion. Fig. 3 shows the associated images of the observed objects in the field of view and a portion of the graduated scale; Fig. 4 is an elevation, partly in section, of the periscope and its housing in a conning tower; Fig. 5 is a diagram of the optical system comprising prisms and lenses.

The periscope consists of a tube 1 to which is secured at 2 a top part 3 having light inlets 4 and 5 of clear glass. The light from the observed objects within the field of view enters at the light inlet 4 and, preferably, a part of it is obstructed by the prism 6 while the remaining part passes into the prism 8. The glass window 5, or any source of light, illuminates the compass scale or card beneath it. A part of this light then passes through the prism 6 and the lens 7 in proximity thereto, and then in conjunction with the light from the field of view entering at 4, passes into the prism 8. The combined light is reflected and transmitted by an ordinary optical system comprising the prisms 8 and 12 and lenses 22, 9, 10, 11 and 13 to the eye of the observer placed at the eyepiece 14. Thus, in the eyepiece 14 is seen the image of the observed objects within the field of view combined with the image of a part of the compass scale, as illustrated in Fig. 3.

The compass comprises a pivot point of support 15 for the magnet 16 which carries a compass card or graduated circular scale 17. The compass card is in line with the pivot point, so that correct readings will be obtained, even when the tube 1 stands at an angle with the perpendicular. Preferably the center of the compass card is in a vertical plane with the center of the inlet 4, and the prism 6 is so arranged that the image of that portion of the graduated scale of the compass which is immediately adjacent to this vertical plane is associated with the image of the distant objects in the field of view, as shown in Fig. 3. Lens 7 is so placed and proportioned that the light passing through it from the compass card is brought to a focus in the same plane as the light from distant objects in the field of view. Thus the images of the distant objects in the field of view and the image of the compass card are seen clearly with the same setting of the eyepiece. In operation the vertical cross-hair 18 is laid upon any desired object in the field of view by turning the periscope by means of the worm 19 and gear 20, and the compass bearing of the object is then determined by the intersection of the vertical cross-hair with the image of the graduated scale. The cross hairs are preferably located in the eye piece except in the case of a rotatable periscope with a stationary eye piece, in which case the cross hairs are preferably in the rotatable member. If desired the horizontal cross hair may be omitted.

An incandescent lamp 21 may be used for additional illumination within the periscope, in order to provide sufficient light on dull or dark days, or such artificial illumination may be relied upon entirely, the glass 5 in that case being replaced by an opaque cover. When such an incandescent lamp is used, the prism 8 may be covered with a shield as indicated at 21' in Fig. 1.

It will be observed that the arrangement described is characterized by the fact that the field of view and the compass-card are viewed through two separate objectives, the field of view through the objective 22, which focuses the light rays coming through the inlet 4 upon a focal plane at which the condensing lenses 9, 10 are located; and the compass-card through the auxiliary objective 7, which so directs the light rays from the compass-card that they are likewise focused upon the same focal plane. Furthermore, the system of light rays coming from the field of view and the system of light rays coming from the compass-card have, as viewed through the eye-piece, parallel axes so that they appear to lie in the same direction. In the preferred form of the invention, the prism 6 is so arranged that it intercepts a part of the light rays from the field of view, thus shadowing or screening off a part of that field, and the light rays from the compass-card are so introduced that they lie within this shadowed or intercepted portion of the field of view, so that to an observer at the eye-piece, the field of view and the compass-card are together visible in juxtaposition, as indicated on Fig. 3 of the drawings.

It is apparent that the construction herein described may be modified in many details without departing from the essential features of my invention. The system of prisms and lenses may be modified in any well known manner; and the light inlets or the substitutes therefor may be arranged in any other relation, the essential condition being that the relation be properly included in determining the angular position of the object in the field of view.

It will be observed that in the preferred embodiment of the invention described the compass is compactly mounted at the top of the periscope tube, without substantially enlarging the tube, and is removed to the greatest possible distance from the magnetically disturbing hull of the boat.

Having thus described my invention, what I claim is:

1. In combination with a periscope, a compass having a scale, means for illuminating said scale, an inlet for light from the field of view, and an optical system so arranged that the image of said scale is combined with the image of the objects within the field of view; substantially as described.

2. In combination with a periscope, a compass having a scale, a light inlet for illuminating said scale, an inlet for light from the field of view, and an optical system so arranged that the image of said scale is combined with the image of the objects within the field of view; substantially as described.

3. In combination with a periscope, a compass having a scale, means for illuminating said scale, an inlet for light from the field of view, and an optical system, the said apparatus being so arranged that the central line of the image of said scale coincides with the central line of the image of the field of view; substantially as described.

4. In combination with a periscope, a compass having a scale, means for illuminating said scale, an inlet for light from the field of view, an optical system, means for turning the periscope, and a hair-line, said apparatus being so arranged that the compass bearing of an object within the field of view is indicated by the intersection of the said hair-line with the image of the object and the image of said scale; substantially as described.

5. A periscope tube containing an optical system for observing objects within the field of view, in combination with a compass having a graduated compass card in the upper end of the periscope tube, means for illuminating the compass card, and suitable light deflecting means adapted to produce an image of a part only of the compass scale in conjunction with the image of said objects; substantially as described.

6. A periscope tube containing an optical system for observing objects within the field of view, in combination with a compass having a graduated compass card in the upper end of the periscope tube, means for illuminating the compass card, and suitable light deflecting means associated with said optical system and adapted to produce an image of said objects in conjunction with an image of that portion of the compass scale which lies immediately adjacent to a vertical plane passing through the center of the observing orifice of the periscope tube; substantially as described.

7. A periscope tube having a compass with a graduated compass card at its upper end, means for illuminating the compass card, and a suitable optical system for producing at the lower end of the tube an image of the compass card; substantially as described.

8. A periscope having an eye-piece and an objective adapted to be directed to a field of view, in combination with a magnetically directed compass-card and a second objective focused upon said compass-card, the fields of said two objectives being together visible in said eye-piece; substantially as described.

9. A periscope having an eye-piece and an objective adapted to be directed to a field of view, in combination with a magnetically directed compass-card, a second objective focused upon said compass-card and a light-deflecting element screening a part of the rays from the field of view and deflecting into the place thereof rays from the compass-card, whereby the fields of said two objectives are together visible in juxtaposition in said eye-piece; substantially as described.

In testimony whereof I affix my signature, in presence of two witnesses.

CHARLES H. BEDELL.

Witnesses:
 F. L. BRAKE,
 W. D. FESLER.